March 30, 1926.

E. W. JOHNSON

SHOCK ABSORBER

Filed July 18, 1925     2 Sheets-Sheet 1

1,578,319

INVENTOR
Ernest William Johnson
By Byrnes, Stebbins & Parmelee
His Attys

March 30, 1926.  
E. W. JOHNSON  
SHOCK ABSORBER  
Filed July 18, 1925  
1,578,319  
2 Sheets-Sheet 2
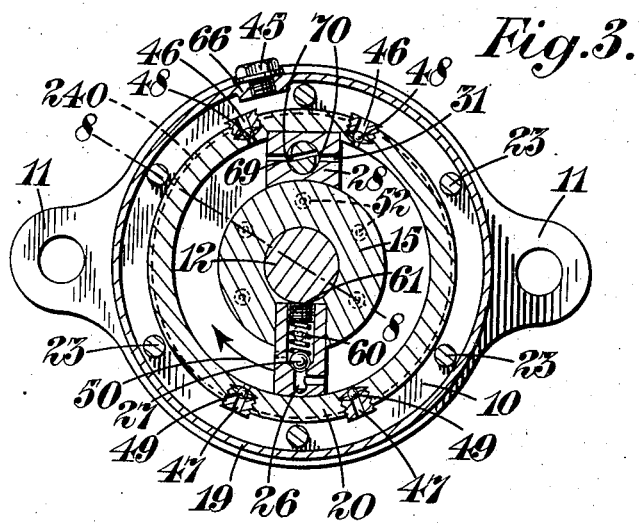
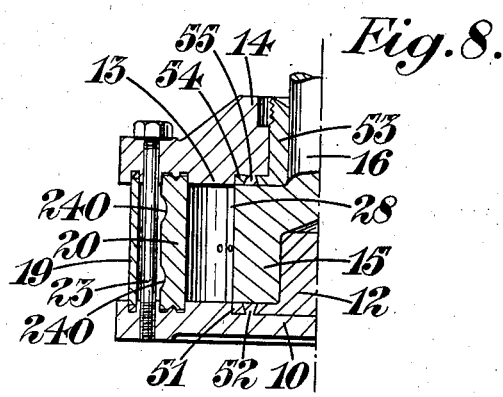
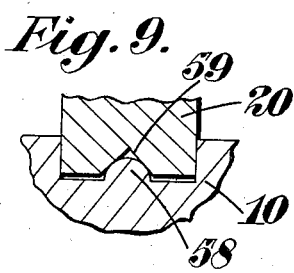
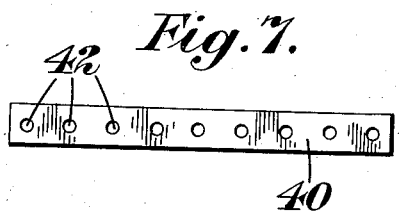

Patented Mar. 30, 1926.

1,578,319

UNITED STATES PATENT OFFICE.

ERNEST WILLIAM JOHNSON, OF LONDON, ENGLAND, ASSIGNOR OF ONE-HALF TO DONALD COLEMAN DEFRIES, OF LONDON, ENGLAND, AND ONE-HALF TO COLIN DEFRIES, OF HOVE, SUSSEX, ENGLAND.

SHOCK ABSORBER.

Application filed July 18, 1925. Serial No. 44,464.

*To all whom it may concern:*

Be it known that I, ERNEST WILLIAM JOHNSON, a subject of the King of England, residing at London, in England, have invented certain new and useful Improvements in Shock Absorbers, of which the following is a specification.

This invention is for improvements in or relating to shock absorbers of the type, more particularly intended for vehicles, in which a main working chamber enclosing one or more vanes and one or more co-operating abutments is automatically kept charged with working liquid from a recuperator chamber. The invention has for one of its objects to provide a compact and simple construction of shock absorber which can be cheaply manufactured and easily assembled and which shall not be liable to develop air pockets in the working chamber.

According to the invention there is provided a shock absorber of the type above described which is characterized in that the main working chamber and the recuperator chamber are nested, preferably concentrically, the one in the other. Usually the working chamber will be of cylindrical formation and be surrounded by an annular recuperator chamber. Such an arrangement of the chambers promotes compactness and simplicity of construction. According to another feature of the invention there is provided a shock absorber of the type above described which, as to its principal components, comprises two end plates, two separate nested, preferably concentrically nested, open-ended tubes arranged between the end plates and abutting thereagainst at each end, a central hub member whereof the end faces also abut against the end plates, one or more vanes and one or more co-operating abutments arranged to operate in the annular space between the periphery of the hub member and the adjacent tube, and means for drawing the end plates against the ends of the tubes and hub member. Such a construction requires only a minimum amount of machining. The tubes can be drawn with sufficient accuracy and the end plates die-cast, though, of course, the invention is not restricted to these particular methods of manufacturing the individual components.

It is known to employ a vane carried by a hub member, usually a rotary hub member, to operate in the annular space between the latter and the outer wall of the working chamber and so proportioned as to fit closely the walls enclosing such space, such vane having a conduit controlled by a non-return valve extending between its operating faces. According to a feature of the present invention such a vane is detachably and reversibly received in a slot in the hub member and held in place by the end plates, which slot lies parallel to the axis of the hub member and is so situated that an open end is exposed upon removal of one of the end plates. In this way the vane can be changed over so as to work either clockwise or counter-clockwise according to necessity, and this adjustment is all that is needed in order to effect the change, the remainder of the parts of the shock absorber being suitable for operation in either direction.

Other features of the invention relate to the construction and arrangement of the aforesaid tubes, end plates and abutment and other detail parts of the mechanism co-operating therewith, and of air-release and liquid-feeding conduits and valves between the working and recuperator chambers, and of an operating or connecting arm for the shock absorber.

For a more complete understanding of the invention there will now be described, by way of example only and with reference to the accompanying drawings, one constructional form of shock absorber according to the invention. It is to be understood, however, that the invention is not restricted to the precise constructional details set forth.

In these drawings:—

Figure 3 is a section on the line 3—3 of Figure 2.

Figure 7 is a perspective view on a scale smaller than that of the preceding figures of a connecting link.

Figure 8 is a partial section through the shock absorber on the line 8—8 of Figure 3, and Figure 9 is an enlarged detail sectional view.

Like reference numerals indicate like parts throughout the drawings.

Figure 1:
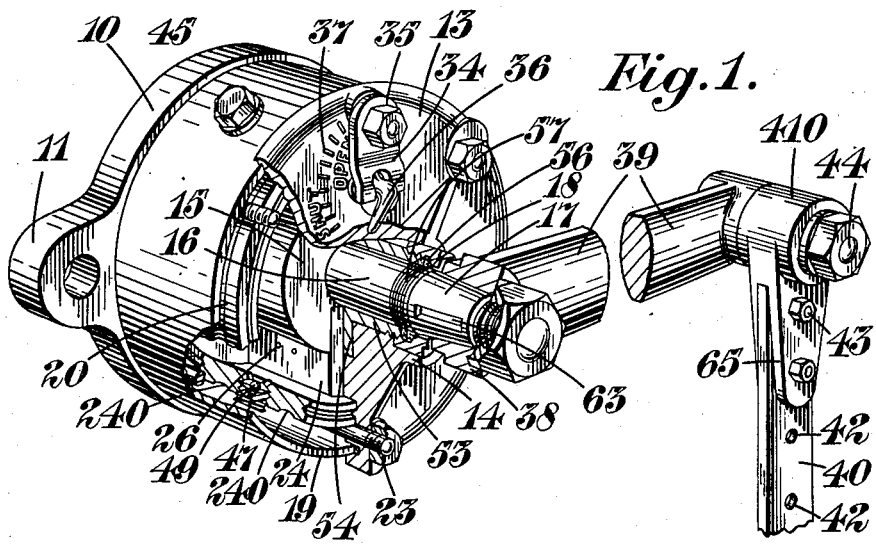
Figure 1 is a perspective view of the shock absorber, parts being broken away.
Figure 2:
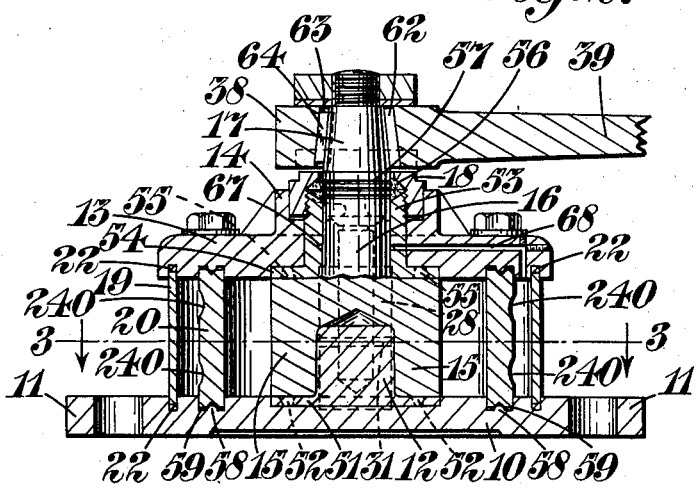
Figure 2 is an axial section through the shock absorber.
Figure 4:
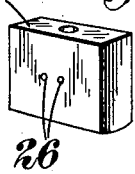
Figure 4 is a perspective view of an operating vane.
Figure 5:
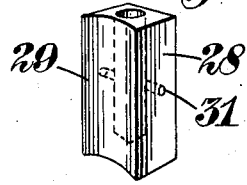
Figure 5 is a perspective view of an abutment.
Figure 6:
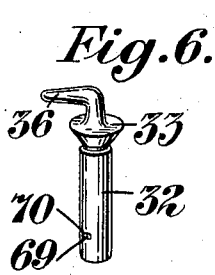
Figure 6 is a perspective view of a plug valve.

The construction of shock absorber illustrated comprises an end plate 10 formed with lugs 11 whereby the whole device may be bolted in position, say to a vehicle chassis or axle. This end plate 10 may conveniently be formed of aluminium, and have a central boss 12 of harder metal on to which the end plate is die-cast. The boss 12 is shown as being formed with a flange 51 having conical perforations 52 into which the metal of the end plate 10 is forced during the die-casting operation, thereby keying and securely holding the end plate 10 and boss 12 together. It will be understood that the axis of this boss will usually lie horizontally. Opposite to the end plate 10 is another end plate 13 having a central perforation surrounded by a boss 14 which extends outwardly. Between the two end plates, and centred upon the boss 12, is a rotary cylindrical hub member 15 having a projection 16 which reaches through the end plate 13. The perforation in the end plate 13 is lined by a sleeve 53 which may conveniently be of hard metal and have the end plate die-cast on to it, in which case the end plate may be made of aluminium. The sleeve 53 is shown as having a flange 54 with perforations 55 which are intended to function similarly to the perforations 52 aforesaid. At the end of the projection 16 is a conical portion 17 to receive an operating arm which will be hereinafter described. The projection 16 is packed in the sleeve 53 by a gland packing comprising a nut 18 which is screwed on the end of the sleeve to compress the packing material 56, the projection 16 being preferably scored with grooves 57 to assist in making a good joint.

The adjacent faces of the plates 10 and 13 are each provided with two circular concentric grooves, the outer being intended to receive a comparatively thin tube 19 and the inner to receive a thicker tube 20. Preferably the dimensions of the grooves and the tubes are such that mechanical pressure is requisite to force the parts together since this will assist in securing good joints. The tube 20 may be packed in its grooves in various ways. In the construction shown, the bases of the grooves for the tube 20 are formed with annular rings 58 (see particularly Figure 9) of semi-circular cross-section, and the opposing faces of the ends of the tube 20 are formed with annular grooves 59 of V-shape. The rings 58 and grooves 59 are of such disposition and dimensions that, if the tube is of steel or like metal and the end plates of aluminium or like relatively soft metal, the action of drawing or forcing the tube and end plates together in operative position will imbed the rings into the grooves more or less filling the latter, and so make a tight joint. The annular space between the ring 20 and the hub member 15 constitutes the working chamber of the shock absorber. The tube 19 may be packed, say, by rings 22 of asbestos, and the annular space between it and the tube 20 constitutes the recuperator chamber. The plates 10 and 13 are drawn together by studs 23 which pass through the interior of the recuperator chamber and to ensure a free passage of the working fluid (usually a viscous liquid such as glycerine or castor oil) past the studs, grooves 240 are shown in the outer surface of the tube 20. To assist in preventing leakage between the projection 16 and sleeve 53, the latter may be formed with a collecting annulus 67 which communicates by a conduit 68 with the recuperator chamber.

Only a single vane is shown, it taking the form of a block 24 of general rectangular formation but with its face 25 cylindrically convex. The face 25 is intended to bear against the inner surface of the tube 20. The vane 24 is received in a slot in the hub member 15, and between its opposite flat side faces there is a conduit 26 controlled by a ball 27 pressed by a spring 60. The spring 60 is received in a pocket closed by a plug 61, and the latter not only serves to prevent leakage but also permits the pressure of the spring to be easily adjusted according to requirements. The end plates 10 and 13 serve to retain the vane in place when once it has been inserted into the slot in the hub member.

Only a single abutment 28 is employed in the construction illustrated, it being of generally rectangular formation but having its face 29 cylindrically concave. This face is intended to bear against the outer periphery of the hub member 15. The abutment 28 is received in a slot in the inner face of the tube 20 and is held in place solely by the end plates 10 and 13. The ends of the abutment 28 are formed to reach into recesses which may conveniently be die-cast in the plates 10 and 13 and will thus locate all the parts in question. Extending between the flat side faces of the abutment 28 is a restricted conduit 31 which, while permitting passage of liquid from either side to the other of the abutment, offers the resistance requisite to give the damping effect of the shock absorber. This passage of the liquid through the conduit 31 is controlled by a plug valve 32 reaching down into the abutment through the end plate 13. There is a passage 69 extending through the valve and leading in grooves 70 communicating with the ends of such passage. The valve 32 is formed with a conical head 33 to make a joint with a seating in the plate 13 and it is pressed against such seating by a spring friction plate 34 fastened by a nut 35. This plate 34 will operate to retain the valve 32 in any desired setting, and adjustment of the valve will be assisted by the pointer 36 which is formed integral with the valve and can be read against a scale 37 on the exterior of the plate 13.

Secured upon the portion 17 of the projection 16 from the hub member 15 is the socketed end 38 of an operating arm 39 having two key ways 62 and 63 situated opposite to each other. Either of these key ways may be arranged to engage a key 64 carried by the conical member 17, the two key ways being provided in order to allow the arm 39 to be mounted in whichever of two alternative settings is the more suitable for the disposition of the shock absorber relatively to the parts it is to control. The other end of the arm 39 is intended to be attached to that other part of the vehicle or other article with respect to which the shock absorber is intended to function. In the construction illustrated, the arm 39 is received upon a spindle 44 which also receives a socket member 410. The latter has jaws 65 lying parallel to the plates 10 and 13, and received in these jaws is the end of a flexible strip 40 constituting a connecting link which is deep or wide and thin in cross-section. Consequently, it is flexible in one plane or direction and stiff in a plane or direction at right angles to the first-mentioned plane or direction. The strip 40 may have a plurality of perforations 42 so spaced as to be suitable for receiving the fixing bolts 43 and permitting the strip to be readily cut off and used at a suitable length according to requirements. The strip 40 reaches to the article with respect to which the shock absorber is intended to function. It will be appreciated that the members 39 and 410 can be arranged to afford oscillatory movement about the axis of the spindle 44, and the flexing of the strip 40 will accommodate any other relative movement which occurs. Instead of one strip 40 as illustrated, two may be employed in some circumstances, one replacing the arm 39, or other forms of operating or connecting arms may be employed.

When the shock absorber is arranged in the operative position, it is preferred that the abutment 28 shall be uppermost. Adjacent to the abutment 28, the tube 19 is provided with a feeding aperture closed by a detachable plug 45 at the situation of which the tube 19 may be thickened by the attachment, say by spot welding, of a small boss 66. Also adjacent to the abutment 28, and on each side of it, are air-release conduits 46 communicating between the working and recuperator chambers, while opposite to the conduits 46, but not necessarily diametrically opposite, are liquid conduits 47. These conduits 47 also communicate between the working and recuperator chambers and are situated towards that portion of the shock absorber which will be lowermost in operation. The conduits 46 and 47 are duplicated as just described in order to allow of reversal of the vane 24. In each of the conduits 46 there is provided a valve 48, say a ball, which is loosely situated free from spring control in a pocket of double frusto-conical form, the widest diameter being towards the middle of the length of the pocket. These are, therefore, seatings at both ends of the pocket which can be closed by the valve 48. The latter is intended so to co-operate with these seatings, and the seatings are intended to be so placed, as to permit expulsion of air from the working chamber and prevent air returning into the working chamber when once expelled and likewise prevent feed of liquid to the working chamber through the respective conduit 46. It is important that free expulsion of air shall be possible, but passage of liquid between the working chamber and the recuperator chamber through the conduits 46 is undesirable since, among other reasons, the result is the bringing of the liquid into an emulsified condition which renders it inefficient. The valves 48 therefore should be so arranged as to permit air to escape, say by fluttering to and from the seatings, but when pressed by the viscous working liquid, the valves 48 should seat firmly and completely close the conduits. This applies to the attempted passage of liquid in either direction, but it may be remarked that the liquid usually employed, say glycerine or castor oil, is of such a nature as not to be capable of readily passing through small conduits.

The conduits 47 which are intended to deal with the passage of liquid between the recuperator and working chambers, are each also preferably provided with a ball or other valve 49 loosely situated in a pocket of similar formation to the pockets in the conduits 46 above described. The seatings in the conduits 47 with which the valves 49 co-operate are, however, somewhat differently arranged from the seatings in the conduits 46. The arrangement for the conduits 47 will be seen in Figure 1; the seating at that end of each pocket which is towards the recuperator chamber is so placed that it can be closed by the valve 49, but the conduit is formed with two mouths at the other end of the pocket, namely that end which is towards the working chamber, these mouths being so situated as not to be capable of being closed by the valve 49. Consequently, free passage of liquid from the recuperator to the working chamber is permissible, but return movement is prevented.

From the foregoing it will be seen that in assembling the parts of the shock absorber, the only screwing operation necessary is in respect of the studs which draw the end plates 10 and 13 together except, of course, the tightening of the gland nut 18 and such adjustment as may be necessary to the nut 35 for the spring plate for the valve 32, and the attachment of the operating arm to the extension of the hub member. The vane 24 and abutment 28 closely fit the walls enclosing the annular space between the tube 20 and the hub member 15, the necessary adjustment in this respect being easy to make, while the assembling of the parts is rendered very easy by reason of the locating projecting ends of the abutment 28.

In operation, with the parts arranged as illustrated, the liquid in the working chamber will offer resistance to the movement of the vane in the direction indicated by the arrow 50, since the valve 27 will be forced upon its seat, but movement in the opposite direction of the vane will be readily permitted. If it is ever desired to change the shock absorber from being adapted to deal with shocks communicated to it in one direction to being suited for dealing with shocks communicated to it in the opposite direction, all that is necessary is to reverse the vane 24 end for end.

It is to be understood that the invention is not restricted to the precise constructional details set forth. For instance, it is not essential that the two tubes should be concentric, so long as they are nested the one in the other. Furthermore, instead of a rotary hub and a stationary body, the converse arrangement could be employed, while in some constructions it may be preferred to have the abutment made a fixture with one of the end plates. Moreover, instead of the valve 27 in the vane being spring-pressed, a guiding pin may be fitted of sufficient length to control the lift of the valve, or the conduit 26 and valve 27 may be omitted, the vane being left solid, in which case the shock absorber would become double-acting.

I claim:—

1. A shock absorber comprising a casing constituting a main working chamber for the reception of a working liquid, a vane and a co-operating abutment enclosed in said chamber, a casing constituting a recuperator chamber and so arranged relatively to the other said casing that the one chamber is nested in the other, and means for automatically keeping the working chamber charged with working liquid from the recuperator chamber.

2. A shock absorber comprising a casing constituting a main working chamber for the reception of a working liquid, a vane and a co-operating abutment enclosed in said chamber, a casing constituting a recuperator chamber and so arranged relatively to the other said casing that the working chamber is concentrically nested in the recuperator chamber, and means for automatically keeping the working chamber charged with working liquid from the recuperator chamber.

3. A shock absorber comprising two end plates, two separate open-ended tubes arranged between the end plates and abutting thereagainst at each end, the one tube being nested in the other tube, a hub member arranged in the inner tube and having its end faces also abutting against the end plates, a vane and a co-operating abutment arranged to operate in the annular space between the periphery of the hub member and the inner tube, and means for drawing the end plates against the ends of the tubes and hub member.

4. A shock absorber comprising two end plates, two separate open-ended tubes arranged between the end plates and abutting thereagainst at each end, the one tube being concentrically nested in the other tube, a hub member centrally arranged in the inner tube and having its end faces also abutting against the end plates, a vane and a co-operating abutment arranged to operate in the annular space between the periphery of the hub member and the inner tube, and means for drawing the end plates against the ends of the tubes and hub member.

5. A shock absorber comprising two end plates each having in the opposing faces two concentric circular grooves, two separate open-ended tubes arranged between the end plates with their ends housed in the said grooves, the one tube being nested in the other tube, a hub member arranged in the inner tube and having its end faces abutting against the end plates, a vane and a co-operating abutment arranged to operate in the annular space between the periphery of the hub member and the inner tube, and means for drawing the end plates against the ends of the tubes and hub member.

6. A shock absorber comprising two end plates each having in the opposing faces two circular grooves, the one of which is of smaller diameter than and is enclosed by the other, two separate open-ended tubes arranged between the end plates with their ends housed in the said grooves, the one tube being nested in the other tube, joint-making means between the end faces of the tubes and the opposing bases of the grooves in which they are housed, such joint-making means comprising an interengaging ring and recess of dissimilar original cross-sectional contour formed in the material of the said end plates and tubes, a hub member arranged in the inner tube and having its end faces abutting against the end plates, a vane and a cooperating abutment arranged to operate in the annular space between the periphery of the hub member and the inner tube, and means for drawing the end plates against the ends of the tubes and hub member thus crushing the said joint-making projections into their co-operating recesses.

7. A shock absorber comprising two end plates, a bearing boss into interlocking engagement with which one of the said end plates is die-cast in such a position that the said boss projects towards the other end plate, two separate open-ended tubes arranged between the end plates and abutting thereagainst at each end, the one tube being nested in the other tube, a hub member arranged in the inner tube and having its end faces also abutting against the end plates and also having a recess whereby the hub member is centred upon the aforesaid bearing boss, a vane and a co-operating abutment arranged to operate in the annular space between the periphery of the hub member and the inner tube, and means for drawing the end plates against the ends of the tubes and hub member.

8. A shock absorber comprising two end plates, a bearing boss having a perforated flange whereby one of the said end plates is die-cast into interlocking engagement with it in such a position that the said boss projects towards the other end plate, two separate open-ended tubes arranged between the end plates and abutting thereagainst at each end, the one tube being nested in the other tube, a hub member arranged in the inner tube and having its end faces also abutting against the end plates and also having a recess whereby the hub member is centred upon the aforesaid bearing boss, a vane and a co-operating abutment arranged to operate in the annular space between the periphery of the hub member and the inner tube, and means for drawing the end plates against the ends of the tubes and hub member.

9. A shock absorber comprising two end plates, a bearing boss having a flange with keying perforations therein whereby one of the said end plates is die-cast into interlocking engagement with it in such a position that the said boss projects towards the other end plate, two separate open-ended tubes arranged between the end plates and abutting thereagainst at each end, the one tube being nested in the other tube, a hub member arranged in the inner tube and having its end faces also abutting against the end plates and also having a recess whereby the hub member is centred upon the aforesaid bearing boss, a vane and a co-operating abutment arranged to operate in the annular space between the periphery of the hub member and the inner tube, and means for drawing the end plates against the ends of the tubes and hub member.

10. A shock absorber comprising two end plates, two separate open-ended tubes arranged between the end plates and abutting thereagainst at each end, the one tube being nested in the other tube, a hub member arranged in the inner tube and having its end faces also abutting against the end plates, said hub member being prolonged through one of the end plates, an operating arm on said prolongation, a bearing sleeve for said prolongation into interlocking engagement with which sleeve the appropriate end plate is die-cast, a vane and a co-operating abutment arranged to operate in the annular space between the periphery of the hub member and the inner tube, said vane being operated by the hub member, and means for drawing the end plates against the ends of the tubes and hub member.

11. A shock absorber comprising two end plates, two separate open-ended tubes arranged between the end plates and abutting thereagainst at each end, the one tube being nested in the other tube, a hub member arranged in the inner tube and having its end faces also abutting against the end plates, said hub member being prolonged through one of the end plates, an operating arm on said prolongation, a bearing sleeve for said prolongation having a perforated flange whereby the appropriate end plate is die-cast into interlocking engagement with it, a vane and a co-operating abutment arranged to operate in the annular space between the periphery of the hub member and the inner tube, said vane being operated by the hub member, and means for drawing the end plates against the ends of the tubes and hub member.

12. A shock absorber comprising two end plates, two separate open-ended tubes arranged between the end plates and abutting thereagainst at each end, the one tube being nested in the other tube, a hub member arranged in the inner tube and having its end faces also abutting against the end plates, said hub member being prolonged through one of the end plates, an operating arm on said prolongation, a bearing sleeve for said prolongation having a flange with keying perforations therein whereby the appropriate end plate is die-cast into interlocking engagement with it, a vane and a co-operating abutment arranged to operate in the annular space between the periphery of the hub member and the inner tube, said vane being operated by the hub member, and means for drawing the end plates against the ends of the tubes and hub member.

13. A shock absorber comprising two end plates, two separate open-ended tubes arranged between the end plates and abutting thereagainst at each end, the one tube being nested in the other tube, a hub member arranged in the inner tube and having its end faces also abutting against the end plates, a vane and a co-operating abutment arranged to operate in the annular space between the periphery of the hub member and the inner tube, said vane having a conduit extending between its operating faces, a non-return valve controlling said conduit, spring-loading means for said valve, adjustable means for varying the spring-loading, and means for drawing the end plates against the ends of the tubes and the hub member.

14. A shock absorber comprising two end plates, two separate open-ended tubes arranged between the end plates and abutting thereagainst at each end, the one tube being nested in the other tube, a hub member arranged in the inner tube and having its end faces also abutting against the end plates, a vane and a co-operating abutment arranged to operate in the annular space between the periphery of the hub member and the inner tube, said vane being arranged to fit closely the walls enclosing the aforesaid annular space and being carried by the hub member detachably and reversibly in a slot and held in place by the end plates, which slot lies parallel to the axis of the hub member and is so situated that an open end is exposed on removal of one of the end plates, said vane having a conduit extending between its operating faces, a non-return valve controlling said conduit, and means for drawing the end plates against the ends of the tubes and the hub member.

15. A shock absorber comprising two end plates, two separate open-ended tubes arranged between the end plates and abutting thereagainst at each end, the one tube being nested in the other tube, a hub member arranged in the inner tube and having its end faces also abutting against the end plates, a vane and a cooperating abutment arranged to operate in the annular space between the periphery of the hub member and the inner tube, said abutment being arranged to fit closely the walls enclosing the aforesaid annular space and being carried by the inner tube detachably in a slot and held in place by the end plates, means for locating the abutment relatively to the end plates, and means for drawing the end plates against the ends of the tubes and hub member.

16. A shock absorber comprising two end plates with locating recesses in their opposed faces, two separate open-ended tubes arranged between the end plates and abutting thereagainst at each end, the one tube being nested in the other tube, a hub member arranged in the inner tube and having its end faces also abutting against the end plates, a vane and a co-operating abutment arranged to operate in the annular space between the periphery of the hub member and the inner tube, said abutment being arranged to fit closely the walls enclosing the aforesaid annular space and being carried by the inner tube detachably in a slot and held in place by the end plates, said abutment having projections which reach into the foresaid locating recesses in the end plates, and means for drawing the end plates against the ends of the tubes and the hub member.

17. A shock absorber comprising a casing constituting a main working chamber for the reception of a working liquid, a vane and a co-operating abutment enclosed in said chamber, a casing constituting a recuperator chamber and so arranged relatively to the other said casing that the one chamber is nested in the other, the innermost casing being perforated towards that portion of the shock absorber which will be uppermost in operation to constitute an air release conduit communicating between the working and recuperator chambers, such conduit being formed with a pocket between its ends and seatings at the conduit mouths at each end of said pocket, a valve for the conduit loosely situated free from spring control in said pocket and co-operating with the seatings so as to permit expulsion of air from the working chamber and prevent air returning into the working chamber when once expelled and likewise prevent feed of liquid to the working chamber through the said conduit, and means for automatically keeping the working chamber charged with working liquid from the recuperator chamber.

18. A shock absorber comprising a casing constituting a main working chamber for the reception of a working liquid, a vane and a co-operating abutment enclosed in said chamber, a casing constituting a recuperator chamber and so arranged relatively to the other said casing that the one chamber is nested in the other, the innermost casing being perforated towards that portion of the shock absorber which will be lowermost in operation to constitute a liquid-feeding conduit communicating between the working and recuperator chambers, such conduit being formed with a pocket between its ends and a seating at that mouth which is towards the recuperator chamber, and a valve for said conduit loosely situated in the pocket, the mouth of the conduit at that end which is towards the working chamber being so situated as not to be capable of being closed by the valve, so as to ensure free passage of liquid from the recuperator to the working chamber and prevent return movement.

19. A shock absorber comprising a casing constituting a main working chamber for the reception of a working liquid, a vane and a co-operating abutment enclosed in said chamber, a casing constituting a recuperator chamber and so arranged relatively to the other said casing that the one chamber is nested in the other, means for automatically keeping the working chamber charged with working liquid from the recuperator chamber, and an operating arm for said vane, which arm is of deep and thin cross-section so as to be resilient in one plane and stiff in a second plane.

20. A shock absorber comprising a casing constituting a main working chamber for the reception of a working liquid, a vane and a co-operating abutment enclosed in said chamber, a casing constituting a recuperator chamber and so arranged relatively to the other said casing that the one chamber is nested in the other, means for automatically keeping the working chamber charged with working liquid from the recuperator chamber, and an operating arm for said vane, which arm is of deep and thin cross-section so as to be resilient in one plane and stiff in a second plane, and which arm is perforated to afford a plurality of alternative points of attachment.

21. A shock absorber comprising two end plates, two separate open-ended tubes arranged between the end plates and abutting thereagainst at each end, the one tube being nested in the other tube, a hub member arranged in the inner tube and having its end faces also abutting against the end plates, said hub member being prolonged through one of the end plates, an operating arm operatively connected to said prolongation, which arm is of deep and thin cross-section so as to be resilient in one plane and stiff in a second plane, a vane and a co-operating abutment arranged to operate in the annular space between the periphery of the hub member and the inner tube, said vane being operated by the hub member, and means for drawing the end plates against the ends of the tubes and hub member.

In testimony whereof I affix my signature.

ERNEST WILLIAM JOHNSON.